United States Patent [19]

Feder

[11] 3,710,558
[45] Jan. 16, 1973

[54] SEPARATOR OF FLUID-SOLID MIXTURES

[75] Inventor: Friedhelm R. Feder, Whitehaven, Tenn.

[73] Assignee: Wedco, Inc., Garwood, N.J.

[22] Filed: Feb. 25, 1970

[21] Appl. No.: 14,091

Related U.S. Application Data

[63] Continuation-in-part of Ser. No. 778,995, Nov. 26, 1968, abandoned.

[52] U.S. Cl. .................. 55/338, 55/459, 209/30, 209/144
[51] Int. Cl. .............................................. B04c 5/04
[58] Field of Search .............. 55/338–340, 349, 55/459, 460; 209/144, 30; 23/314

[56] References Cited

UNITED STATES PATENTS

| 420,072 | 1/1890 | Johnson et al. | 55/345 |
|---|---|---|---|
| 3,200,568 | 8/1965 | McNeil | 55/459 |
| 3,318,070 | 5/1967 | Zeiss et al. | 55/343 |
| 3,516,551 | 6/1970 | Wallen et al. | 55/459 |
| 770,592 | 9/1904 | Hollingsworth | 55/459 |
| 1,835,445 | 12/1931 | Thompson et al. | 55/340 |
| 1,953,948 | 4/1934 | Bieth | 55/1 |
| 2,915,365 | 12/1959 | Saussol | 55/459 |
| 3,473,300 | 10/1969 | Wilm et al. | 55/349 |

Primary Examiner—Bernard Nozick
Attorney—Frank M. Murphy and Burgess, Dinklage & Sprung

[57] ABSTRACT

System for separation of fluid-solid mixture from, for example, a mill. The mixture is introduced into a fluid-solid separator having a horizontally disposed cylindrical body portion, a tangential inlet adjacent one end of the body portion, and an outlet for separated solids adjacent the other end of the body portion. Suction means are mounted on the outlet end of the body portion and the inlet of the suction means serves to discharge the separated fluid from the horizontally disposed separator. A sifter for the separated solids can be disposed below the separator.

The separated fluid, containing some entrained solids, can be introduced into a vertically disposed cyclone separator. The solids separated in the vertically disposed cyclone separator can be recycled to the inlet of the horizontally disposed separator.

The use of a horizontally disposed separator according to the inventor reduces the headroom required.

2 Claims, 6 Drawing Figures

INVENTOR
FRIEDHELM R. FEDER

INVENTOR
FRIEDHELM R. FEDER
BY
Frank M. Murphy
ATTORNEY 3,710,558

SEPARATOR OF FLUID-SOLID MIXTURES

This application is a continuation-in-part of application Ser. No. 778,985, filed Nov. 26, 1968, now abandoned.

This invention is concerned with separation of fluid-solid mixtures such as separation of the solid particles in a pneumatically conveyed stream, from the conveying medium. The fluid-solid mixture can be the discharge of a size reduction mill working plastics such as polyethylene, polypropylene, etc.

THE INVENTION

A principal object of the invention is a separator, and a system employing the separator reducing the headroom required by the system.

The system is suited for use in regular production processing, and is particularly well suited for use in pilot plant work directed to determining the best processing conditions for a particular plastic to provide a product having the desired properties.

The schematic flow diagram, FIG. 1, described in detail infra, indicates the system according to the invention. The solid particles discharged from a mill are pneumatically conveyed to a horizontally disposed fluid-solid separator, which, because of its horizontal disposition, requires relatively little headroom, and which for economy in the flow pattern of the solid particles is disposed above the sifter, e.g., a screen, located, for the same reason, above the mill.

The separator comprises a cylindrical body portion outfitted with end plates closing the ends thereof, and having a tangential inlet adjacent one end thereof for entry of the pneumatically conveyed stream, and an outlet for separated solids connecting with said cylindrical body portion, adjacent the other end thereof. Suction means, e.g., a centrifugal fan, can be in communication with, e.g. mounted on, the outlet end of the separator, and the inlet of the suction means serves as the discharge for separated fluid, e.g., air. The stream follows a helical path in the separator moving from inlet end to outlet end, and during this travel, centrifugal force works to effect the separation.

The solids discharging from the separator can be conveyed to the sifter which effects a size separation, the undersize being product and the oversize being returned to the mill.

Desirably, the system includes a conventional, vertically disposed, cyclone separator connected in series to receive and process the fluid, still entraining some solid particles, discharged by the suction means or blower mounted on the horizontally disposed separator. The solids discharging from the bottom of the vertically disposed separator are recycled to the inlet of the horizontally disposed separator.

Air enters the mill with the feed and the mill pumps the air to the horizontally disposed separator. The suction means adds to the pumping action of the mill, drawing air into the system. The line connecting the solids discharge of the vertically disposed separator and the inlet of the horizontally disposed separator can be an open line. The pressure at the inlet of the horizontally disposed separator is less than the pressure at the solids discharge of the vertically disposed separator and air therefore passes through the mentioned line, pneumatically conveying the solids separated in the vertically disposed separator to the inlet of the horizontally disposed separator.

EMBODIMENTS

The accompanying drawings illustrate embodiments of the invention.

In the drawings, like reference characters refer to corresponding parts.

THE PLANT

Figure 1:
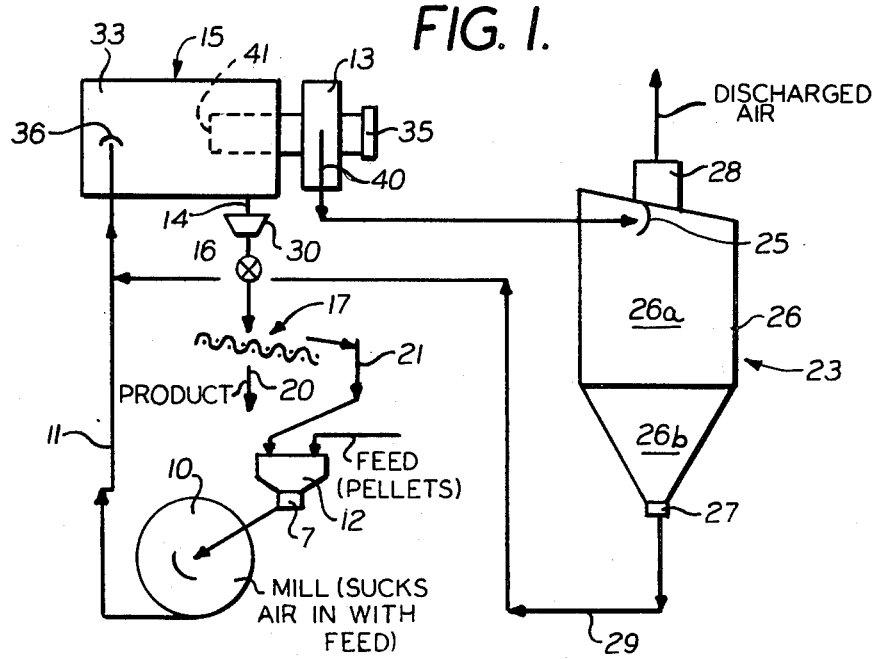
FIG. 1 is a schematic flow diagram depicting a system according to the invention.
Figure 2:
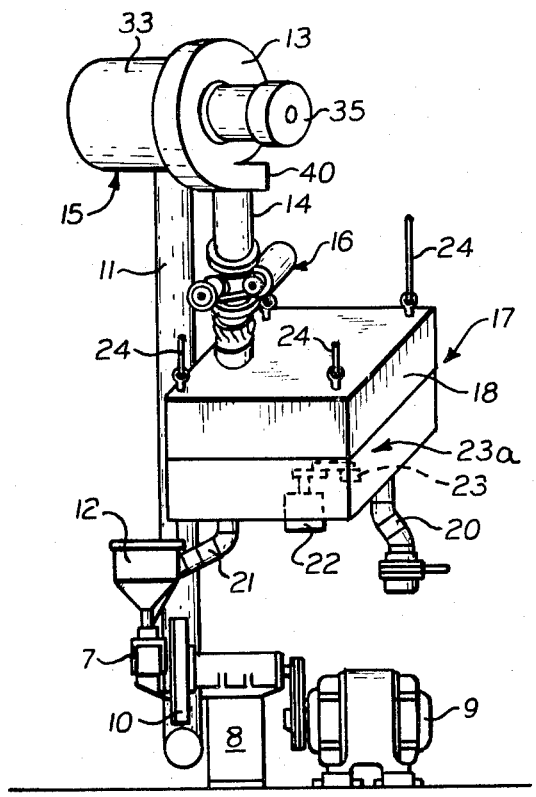
FIG. 2 is an isometric view of a portion of a system as is shown in FIG. 1.

Referring to the drawings, particularly FIGS. 1 and 2, the plant or system includes mill 10 driven by motor 9 via a power linkage mounted on stand 8. The mill is a disc mill having one rotating plate and one stationary plate, the construction being of the type disclosed in my copending application Ser. No. 656,384, filed July 27, 1967. Material to be size reduced is placed in hopper 12 and is conveyed to the mill by feeder 7. The mill pumps air and centrifugal fan 13 draws air through the mill so that a draft pneumatically conveys the mill output through inlet conduit 11 to the horizontally disposed separator 15.

The solids separated by separator 15 leave via outlet 14, pass into hopper 30 (FIG. 1) and are metered by star valve 16 to sifter 17, a size separator, which divides the particles into an undersize fraction which leaves the size separator via line 20 as product, and an oversize fraction which passes via line 21 to the feeder 7 for return to the mill 10.

The sifter 17 can be a screen as is indicated in FIG. 2, or a free swinging single box sifter as is shown in FIG. 1. The free swinging box sifter (FIG. 1) is suspended from cables 24 and is outfitted with a motor drive 22. My said copending application Ser. No. 778,985 is directed to the free swinging box sifter.

The centrifugal fan or blower 13 discharges air and entrained solids via outlet 40, and this stream is conveyed to the vertically disposed separator 23, which can be a conventional cyclone separator. The vertically disposed separator 23 is a fluid-solid separator comprising a vertically disposed body portion 26 including a cylindrical section 26a and downwardly converging cone section 26b. A tangential inlet 25 for the entering fluid is provided adjacent the upper end of the body portion, as is also, in the conventional manner, an outlet 28 for discharge from the separator 23 of separated fluid. An outlet 27 for separated solids, which can include a bin and bindicator, is disposed adjacent to the lower end of of the body portion 26.

Figure 3:
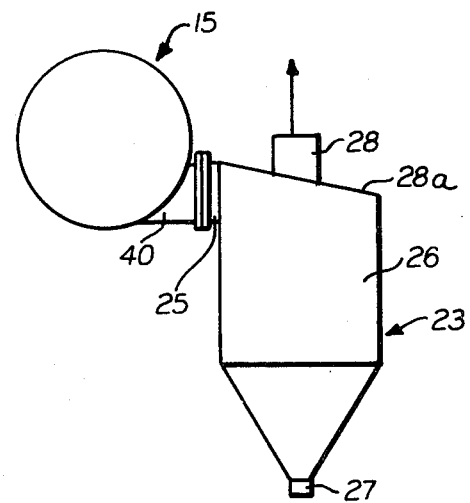
FIG. 3 shows a preferred manner of combining the horizontally disposed and vertically disposed separators.

The means communicating the discharge of the suction means or blower 13 with the inlet of the vertically disposed separator 23, can be, and preferably is, a short conduit; indeed the outlet 40 of the blower 13 is desirably directly connected to the inlet 25 of the vertically disposed separator, flange to flange, as is shown in FIG. 3.

The top 23a of separator 23 is at an angle as is shown in FIG. 3, of 5°–20°, preferably 10°–15°, to impart to the entering fluid stream a directional component in the direction of the separated solids outlet 27.

In the plant, a conduit 29 (FIG. 1) communicates the outlet 27 of vertically disposed separator 23 with the inlet 36 of the horizontally disposed separator for recycling solids separated by the vertically disposed separator 23 to the horizontally disposed separator 15.

Figure 4:
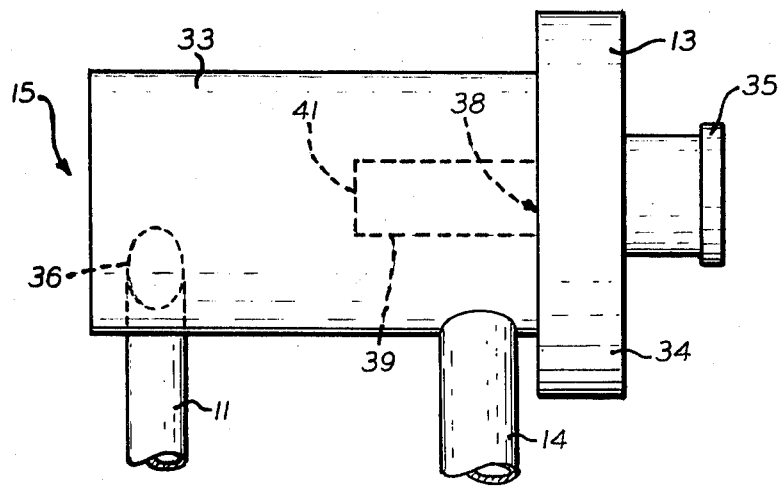
FIG. 4 is a side elevation view of a horizontally disposed separator according to the invention.

A practial design parameter of a system as is the concern of the applicant is that a separator be disposed above a sifter which is to serve to separate oversize particles for recycling to the size reducer, here the mill 10. This, where conventional separators are used, imposes large headroom requirements for the system, as the conventional separators are of the vertically disposed, cyclone type such as the separator 23 (FIGS. 1 and 4). By using a horizontally disposed separator 15, particularly in combination with a vertically disposed separator 23, as is indicated in FIG. 1, the headroom requirements can be significantly reduced. Thus, it is only required that the horizontally disposed separator 15 be disposed above the sifter 17; it is not necessary to position a high, vertically disposed cyclone separator above the sifter.

With a system of the invention, the top of the vertically disposed separator 23 can be below about the top of the horizontally disposed separator 15. As a practical matter, the vertical separator can be at any desired height.

In operation, the pressure at outlet 27 of vertically disposed separator 23 is negative, while the pressure at the inlet 36 of the horizontally disposed separator 15 is more negative, so that the solids separated in the vertical separator and pneumatically conveyed to the inlet 36 of horizontal separator 15.

THE SINGLE BOX FREE SWINGING SIFTER

The sifter, in the form of a single box free swinging sifter is described in detail in my said application Ser. No. 778,985. It comprises (FIG. 2) a box 18 having sifting elements operatively mounted therein, in a known arrangement, a motor drive 23a having its shaft centerline coaxial with the vertical axis of the box, and a box drive weight 23b mounted on the shaft for oscillating the box. The box drive weight is in the horizontal plane of balance of the sifter as is described in Ser. No. 778,985. The motor 22 of the motor drive 23a is mounted on the box 18.

THE HORIZONTALLY DISPOSED SEPARATOR

The horizontally disposed separator 15 is a fluid-solid separator comprising a horizontally disposed, cylindrical, hollow body portion 33, having a tangential inlet 36, as is common in cyclone separators—separator 15 is a cyclone separator. Inlet 36 is adjacent one end of the body portion 33. At the other end of the separator, there is an outlet 14 for separated solids. This outlet is disposed in the lower half of the separator, more particularly at the lowermost portion, as shown in FIG. 4. Also, at the solids outlet end, is a suction means, which in the embodiment illustrated is a centrifugal fan 13 mounted on the separator body portion 33. The fan includes the housing 34 in which the impeller (not shown) is mounted, the motor drive 35, and an inlet 38 to the fan. Desirably, a conduit communicates the fan inlet 38 with the separator body portion 33. Conduit 39 is for discharge of separated fluid, e.g., air. The open end 41 of conduit 39 preferably terminates inwardly, 6–12, e.g., about 8 inches, from fan inlet 38; preferably it terminates inwardly of the outlet 14 for separated solids. The inlet 38, and conduit 39 are coaxial with the axis of the separator body portion 33.

The separated fluid, e.g., air, leaves the fan 13 via discharge 40 (FIGS. 1 and 2), and can be conveyed from the discharge to the vertically disposed separator 23 (FIG. 1).

The impeller (not shown) of blower or fan 13 should rotate in the same direction as the air rotates in the separator 15, particularly when the blower is mounted on or adjacent the separator 15, as shown in FIG. 4. If the blower is mounted remotely from the separator 15 the mentioned relationship is not of great importance.

Figure 5:
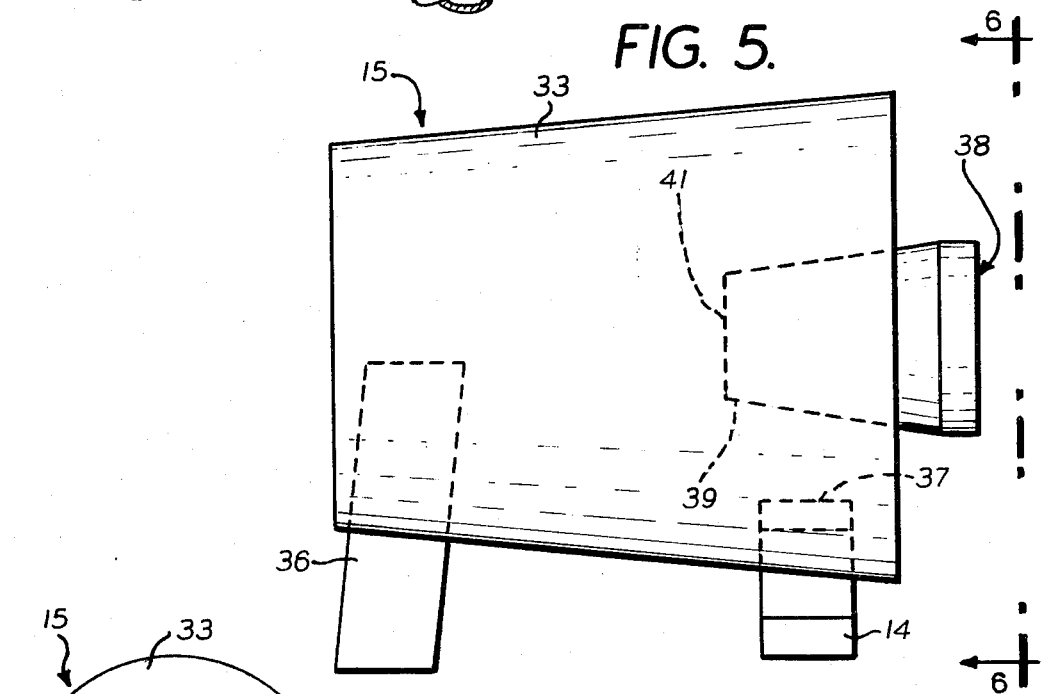
FIG. 5 is a side elevation view of a preferred construction for the horizontally disposed separator.
Figure 6:
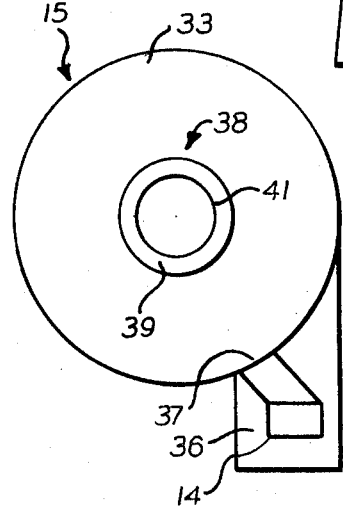
FIG. 6 is an end elevation view taken along line 6-6 in FIG. 5.

A preferred construction for the horizontal separator 15 is shown in FIG. 5 and FIG. 6. The tangential inlet 36 is at an angle, e.g., 3°–10°, preferably about 7°, with respect to the plane perpendicular to the axis of the body portion 33, to impart to the entering fluid-solid mixture a directional component toward the outlet 37 for separated solids. Alternately, the end of the separator adjacent the inlet 36 can be cocked as is indicated in FIG. 3 for the top of the vertical separator shown therein, for like reason.

Further, the body portion 33 diverges from the inlet end thereof to the outlet end, to improve the separation. For an overall length of 67 inches the diameter at the inlet and outlet ends can be 40 and 48 inches respectively.

The diameter of the open end 41 of the inlet tube 39 of the suction means or blower 13 (FIG. 4), determines the cut between the solids separated by the horizontal separator 15 and the solids entrained in the air leaving that separator via the blower inlet tube 39. Accordingly the inlet tube 39 can diverge from the open end 41 in order to, on the one hand, provide the desired cut, and on the other hand, reduce pressure drop in the inlet tube 39.

While the invention has been described with respect to particular embodiments thereof, it is not intended that it be limited thereto, those embodiments being merely representative.

What is claimed is:

1. Apparatus for separation of pneumatically conveyed solid from the conveying fluid comprising:
   1. a horizontally disposed fluid-solid separator comprising:
      a. a horizontally disposed hollow cylindrical body portion;
      b. a tangential inlet conduit adjacent one end of the body portion;
      c. an outlet for separated solids adjacent the other end of the body portion;
      d. an outlet for discharge of separated fluid at said other end of the body portion;
   2. a vertically disposed fluid-solid separator comprising:
      a vertically disposed cylindrical body portion, a tangential inlet adjacent the upper end of the body portion, an outlet for separated solids adjacent the lower end of the body portion, and an outlet for discharge of separated fluid, the top of the vertically disposed separator being below about the top of the horizontally disposed separator;
3. an interconnecting conduit communicating the outlet for separated fluid of the horizontal separator with the inlet of the vertical disposed separator for delivery of the separated fluid of the horizontally disposed separator to the vertically disposed separator, for separation of solids entrained in the separated fluid of the horizontally disposed separator,
4. a blower disposed in said interconnecting conduit drawing suction on the horizontal separator for delivery of separated fluid of the horizontal separator to the vertical separator,
5. second conduit means communicating the outlet for separated solids of the vertically disposed separator, with the inlet conduit of the horizontally disposed separator intermediate the ends of the inlet conduit for recycling solids separated by the vertically disposed separator to the horizontally disposed separator, said second conduit means being in open communication with the outlet of the vertically disposed separator and the inlet conduit of the horizontally disposed separator.

2. Apparatus according to claim 1, and means for receiving solids discharged from the outlet for separated solids of the horizontally disposed separator.

* * * * *